United States Patent
Suzuta et al.

(10) Patent No.: US 7,771,674 B2
(45) Date of Patent: Aug. 10, 2010

(54) MULTITUBULAR REACTION APPARATUS FOR CONTACT GAS-PHASE REACTION

(75) Inventors: Tetsuya Suzuta, Ehime (JP); Yasuhiko Mori, Ehime (JP); Takaaki Tanaka, Ehime (JP); Tadashi Abe, Ehime (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 484 days.

(21) Appl. No.: 11/575,912

(22) PCT Filed: Sep. 26, 2005

(86) PCT No.: PCT/JP2005/018213

§ 371 (c)(1),
(2), (4) Date: Mar. 23, 2007

(87) PCT Pub. No.: WO2006/035951

PCT Pub. Date: Apr. 6, 2006

(65) Prior Publication Data

US 2007/0297959 A1  Dec. 27, 2007

(30) Foreign Application Priority Data

Sep. 27, 2004  (JP) .............................. 2004-278758

(51) Int. Cl.
*B01J 8/04* (2006.01)
*B01J 19/00* (2006.01)
*F28D 21/00* (2006.01)

(52) U.S. Cl. ................. 422/197; 422/198; 422/201; 422/205; 422/312; 165/159; 165/161; 165/174

(58) Field of Classification Search ............ 422/198, 422/201, 205, 197, 312; 165/159, 161, 174
See application file for complete search history.

(56) References Cited

U.S. PATENT DOCUMENTS

| 3,871,445 | A | | 3/1975 | Wanka et al. |
| 4,337,224 | A | * | 6/1982 | Mahler et al. ............... 422/197 |
| 5,196,632 | A | | 3/1993 | Larsen et al. |
| 2004/0115118 | A1 | | 6/2004 | Olbert et al. |
| 2004/0126285 | A1 | * | 7/2004 | Olbert et al. ................ 422/130 |
| 2005/0107483 | A1 | * | 5/2005 | Sakakura et al. ............ 518/726 |

FOREIGN PATENT DOCUMENTS

| EP | 0 382 098 A | 8/1990 |
| EP | 1 080 780 A1 | 3/2001 |
| EP | 1 466 883 A1 | 10/2004 |
| JP | 58-83193 A | 5/1983 |
| JP | 3-156289 A | 7/1991 |
| JP | 2001-137689 A | 5/2001 |
| JP | 2001-199710 A | 7/2001 |
| WO | 00/43721 A1 | 7/2000 |

* cited by examiner

*Primary Examiner*—Walter D Griffin
*Assistant Examiner*—Lessanework Seifu
(74) *Attorney, Agent, or Firm*—Sughrue Mion, PLLC

(57) ABSTRACT

The present invention relates to a multitubular catalytic gas-phase reaction apparatus, comprising a plurality of reaction tubes arranged in parallel, a baffle capable of changing the direction of movement of a heat medium introduced into a reactor shell to a direction perpendicular to the longitudinal direction of the reaction tubes, a space that is disposed in a region including a part of a section where the heat medium flows in the direction of the face of the baffle and does not have the reaction tubes arranged therein, and flow-adjusting rods, disposed in between the space and the reaction tubes, having the same longitudinal direction as that of the reaction tubes.

6 Claims, 5 Drawing Sheets

MULTITUBULAR REACTION APPARATUS FOR CONTACT GAS-PHASE REACTION

BACKGROUND OF THE INVENTION

1. Field of the Invention

The present invention relates to a multitubular catalytic gas-phase reaction apparatus suitable for use in the production of chlorine gas.

2. Description of the Related Art

Conventionally, production of industrial gases such as chlorine gas and acrolein that are generated by catalytic gas-phase reaction, generally uses a multitubular reaction apparatus for effective removal of heat generated by exothermal reaction. A multitubular reaction apparatus includes a plurality of reaction tubes charged with a catalyst within a reactor shell, and circulates a heat exchange medium (heat medium) within the reactor shell to cool the reaction tubes and thereby removes reaction heat.

In exothermal reaction using a multitubular reaction apparatus, so-called hot spots may be generated in sites where the efficiency of removal of reaction heat is worsened by drifts of a heat medium flow, or in sites where the catalyst concentration is high and so the reaction speed is high, or the like. In the hot spots, deterioration of a catalyst or a decrease in purity of a reaction product is prone to readily occur due to extreme temperature rises.

When a heat medium is supplied to remove heat of a reactor, the flow of the heat medium in the horizontal direction (lateral direction), that is, in a direction perpendicular to the longitudinal direction of the reaction tube, primarily controls the efficiency of heat removal of the reactor. Accordingly, in order to restrain generation of hot spots, it is effective to control the flow of a heat medium within a reactor shell being homogenized in the lateral direction.

As a method of restraining the generation of hot spots, U.S. Pat. No. 3,871,445 discloses a reaction apparatus including a multitubular reaction tube equipped with a circulation device of a heat medium and a reactor shell having baffles arranged therein. It describes that the presence of the baffles maintains the substantially constant rate of the lateral flow of the heat medium, i.e., the flow in the direction perpendicular to the longitudinal direction of the reaction tubes, within one compartment separated by the baffles. However, in the method described in U.S. Pat. No. 3,871,445, heat removal in the vertical flow, i.e., in the flow in the direction along the reaction tubes is poor as compared with heat removal in the lateral flow, so the heat transfer within one compartment is not sufficiently constant.

On the other hand, European Unexamined Patent Publication No. 10B0780 discloses that, in a multitubular reactor having a disc baffle, the disposition of a space having no reaction tubes arranged therein in the central portion of the reactor shell reduces the influence of a decrease in heat removability due to a vertical flow. However, in this case also, in a site where a heat medium flow in the end portion of the baffle is reversed, portions poor in heat removability in some reaction tubes remain, causing the generation of hot spots in some cases.

European Unexamined Patent Publication No. 1466883 discloses that, in a gas-phase catalytic oxidation method by means of a fixed bed multitubular heat exchange reactor, for the purpose of prevention of hot spot generation arising from nonuniformity of a heat medium flow within a reactor shell, the reaction conditions within the reaction tubes are estimated and the way of charging a catalyst in the reaction tubes is changed on the basis of the results of the estimations in such a way that the nonuniformity of reaction conditions among the reaction tubes is reduced. This case, however, poses a problem in that the method of charging a catalyst is too complicated.

SUMMARY OF THE INVENTION

An object of the present invention is to provide a multitubular catalytic gas-phase reaction apparatus capable of solving the above problems, keeping normal the heat conduction between a reaction tube and a heat medium, restraining the generation of excessive hot spots to maintain the life of a catalyst, preventing the corrosion or breakage of the reaction tube due to an elevated temperature, which does not require a complicated specification and is suitably used particularly in production of chlorine gas.

The present invention relates to a multitubular catalytic gas-phase reaction apparatus, comprising a plurality of reaction tubes arranged in parallel, a baffle capable of changing the direction of movement of a heat medium introduced into a reactor shell to a direction perpendicular to the longitudinal direction of the reaction tubes, a space that is disposed in a region including a part of a section where the heat medium flows in the direction of the face of the baffle and does not have the reaction tubes arranged therein, and flow-adjusting rods, disposed in between the space and the reaction tubes, having the same longitudinal direction as that of the reaction tubes.

In the present invention, the flow-adjusting rods are preferably arranged in the range of from 1 to 10 rows in between the space and the reaction tubes.

Additionally, it is preferred that the reaction tubes are charged with a catalyst and the flow-adjusting rods are dummy tubes not charged with a catalyst in reaction tubes.

As the baffle of the present invention, a disc baffle and a perforated disc baffle are preferably used. In this case, a heat medium inlet and a heat medium outlet are preferably formed as circular conduits.

Moreover, as the baffle of the present invention, a segmental circle baffle is also preferably used. In this case, a heat medium inlet and a heat medium outlet are preferably formed as distributor pipes. When the baffle is a segmental circle baffle, the space is preferably disposed in the segmental baffle window.

In the present invention, it is preferable that the reaction tubes are charged with a catalyst and the inside of the reaction tubes are divided into a plurality of zones by varying the kind and/or amount of the catalyst.

The multitubular catalytic gas-phase reaction apparatus of the present invention is particularly preferably used in the production of chlorine gas.

According to the present invention, the disposition of flow-adjusting rod in between a space not having reaction tubes arranged therein and reaction tubes renders uniform the flow of a heat medium in contact with the reaction tubes and maintains normal the heat conduction between the reaction tubes and the heat medium. This restrains the generation of excessive hot spots, thereby being capable of maintaining the life of a catalyst and preventing corrosion and breakage of the reaction tubes. Additionally, the multitubular reaction apparatus of the present invention can maintain normal the heat conduction between the reaction tubes and the heat medium by arranging a flow-adjusting rod, and thus has an advantage of eliminating the need to control complicated operation conditions.

Figure 1:
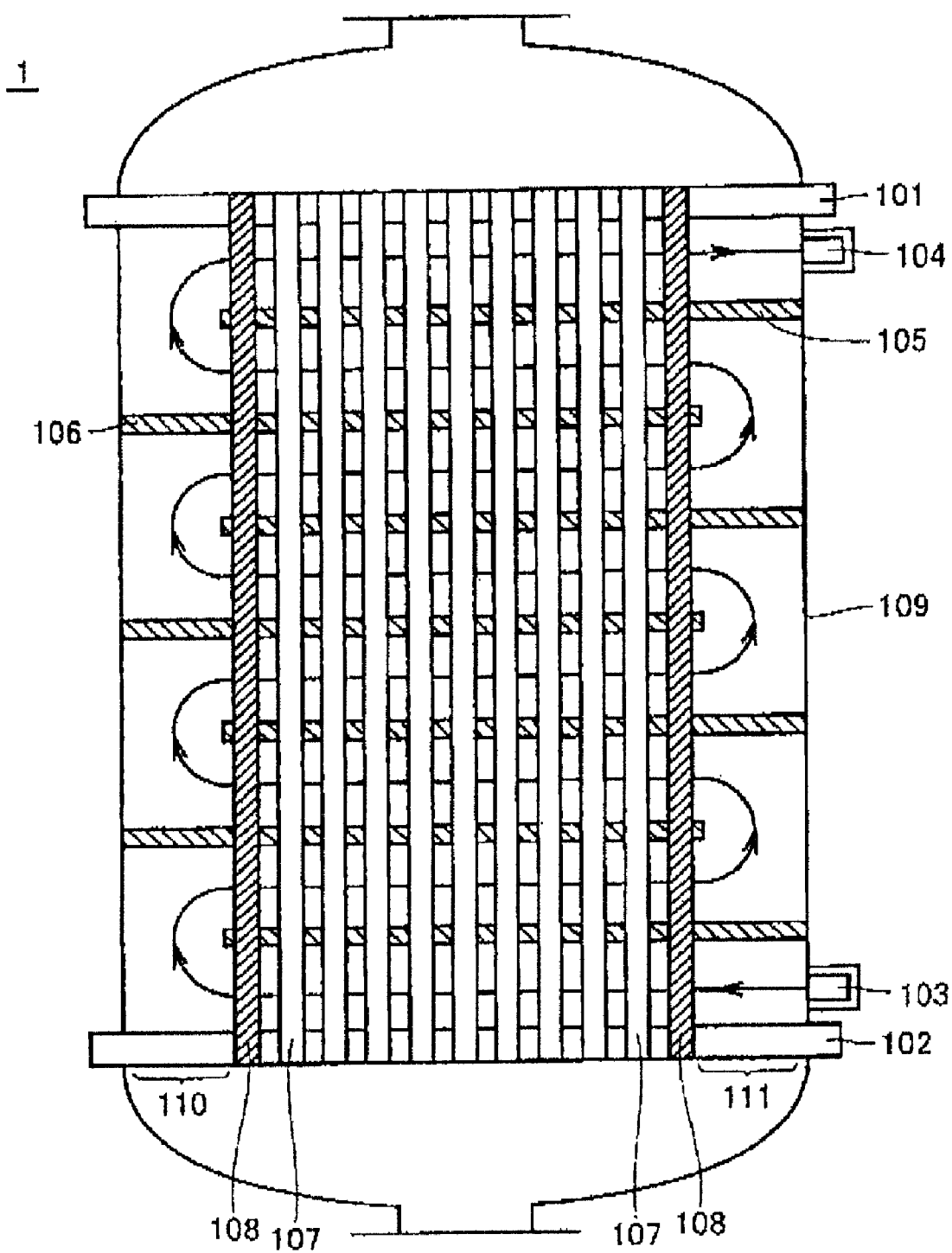
FIG. 1 is a sectional view indicating an embodiment of a multitubular catalytic gas-phase reaction apparatus of the present invention.

1, 2 multitubular reaction apparatus
101, 201 upper tube plate
102, 202 lower tube plate
103, 203 heat medium inlet
104, 204 heat medium outlet
105, 106, 205, 206, 3, 4, 5 baffle
107, 207, 52 reaction tube
108, 208, 53 flow-adjusting rods
109, 209 reactor shell
110, 111, 210, 211 space
31, 33, 41, 43 boundary
51 segmental baffle window

DESCRIPTION OF THE PREFERRED EMBODIMENTS

The multitubular catalytic gas-phase reaction apparatus of the present invention includes a plurality of reaction tubes arranged in parallel, a baffle capable of changing the direction of movement of a heat medium introduced into a reactor shell to a direction perpendicular to the longitudinal direction of the reaction tubes, a space that is disposed in a part of a section where the heat medium flows in the direction of the face of the baffle and does not have the reaction tubes arranged therein and flow-adjusting rods, disposed in between the space and the reaction tubes, having the same longitudinal direction as that of the reaction tubes.

FIG. 1 is a sectional view indicating an embodiment of the multitubular catalytic gas-phase reaction apparatus of the present invention. A multitubular reaction apparatus 1 includes an upper tube plate 101, a lower tube plate 102, a heat medium inlet 103, a heat medium outlet 104, baffles 105, 106, reaction tubes 107 and flow-adjusting rods 108. A heat medium is introduced into the inside of a reactor shell 109 from the heat medium inlet 103 by way of a distributor pipe by means of, for example, a pump (not shown) such as an axial flow pump, a centrifugal pump or the like, and flows in the arrow directions, and then is discharged from the heat medium outlet 104. The baffles 105, 106 of the multitubular reaction apparatus indicated in FIG. 1 are segmental circle baffles; in the longitudinal direction of the reaction tubes are alternately arranged the baffles 105 and 106. In addition, the interval of the baffles 105 and 106 is not particularly limited, and the baffles, depending on the purpose, are disposed in such a way that, for example, the heat transfer coefficient between the heat medium and the reaction tubes is 1000 W/m²K or more.

In a reactor shell having baffles disposed therein, in a site where the direction of movement of a heat medium is changed, the linear speed of a heat medium flow is decreased or an eddy flow is generated, and thus the heat removal efficiency of the site is prone to decrease. For instance, where a heat expansion is present in a reactor shell, a heat medium flow concentrates on the expansion height, so the linear speed of a heat medium flow near baffles above and below the site is decreased in some cases. Here, the heat expansion refers to an expansion and contraction joint for absorbing the difference of an expansion and contraction between a reaction tube group and a reactor shell due to thermal expansion.

In the present invention, in a region including a part of a section where a heat medium flows in the direction of the faces of the baffles 105, 106 in the reactor shell 109, spaces 110, 111 as portions in which the reaction tube 107 is not arranged are disposed. In other words, in sites where heat removability become readily poor due to the disorder of a heat medium flow are not disposed the reaction tubes 107, so that the heat removal of the reaction tubes 107 is uniformly carried out to suppress the generation of excessive hot spots. However, where spaces 110, 111 are disposed, when reaction tubes are simply not arranged in the spaces, the change of a heat medium flow is caused between the sites where the reaction tubes are arranged and the spaces, whereby the heat removability of the reaction tubes adjacent to the spaces becomes sometimes insufficient. Accordingly, in the multitubular reaction apparatus of the present invention, in between the spaces 110, 111 and the reaction tubes 107 are disposed the flow-adjusting rods 108, the longitudinal direction of which are the same as that of the reaction tubes. Although the change of the direction of movement of the heat medium causes disorder in the heat medium flow in the spaces, designing the flow channel of the heat medium in such a manner that the heat medium reaches sites where the reaction tubes 107 are arranged by way of sites where the flow-adjusting rods 108 are arranged substantially gets rid of the disorder in a heat medium in contact with the reaction tubes 107. This renders uniform the heat removability of a plurality of the reaction tubes 107 as well as ensures the heat removability in a desired extent, leading to the restraint of generation of hot spots.

In the multitubular reaction apparatus of FIG. 1, although the figure indicates a case of an up-flow of the heat medium flow, the present invention is not limited thereto, and either an up-flow or a down-flow may be adopted. Additionally, a raw material of catalytic gas-phase reaction supplied to the reaction tubes 107 may also be supplied in an up-flow or a down-flow. That is, the flow channels of the heat medium and the raw material may be concurrent or convective, and selected, as appropriate, depending on the purpose.

In the multitubular catalytic gas-phase reaction apparatus of the present invention, a circulating mechanism is preferably provided in such a way that a heat medium discharged from the heat medium outlet 104 is cooled, and then is again supplied from the heat medium inlet 103 to the inside of the reactor shell.

Figure 2:
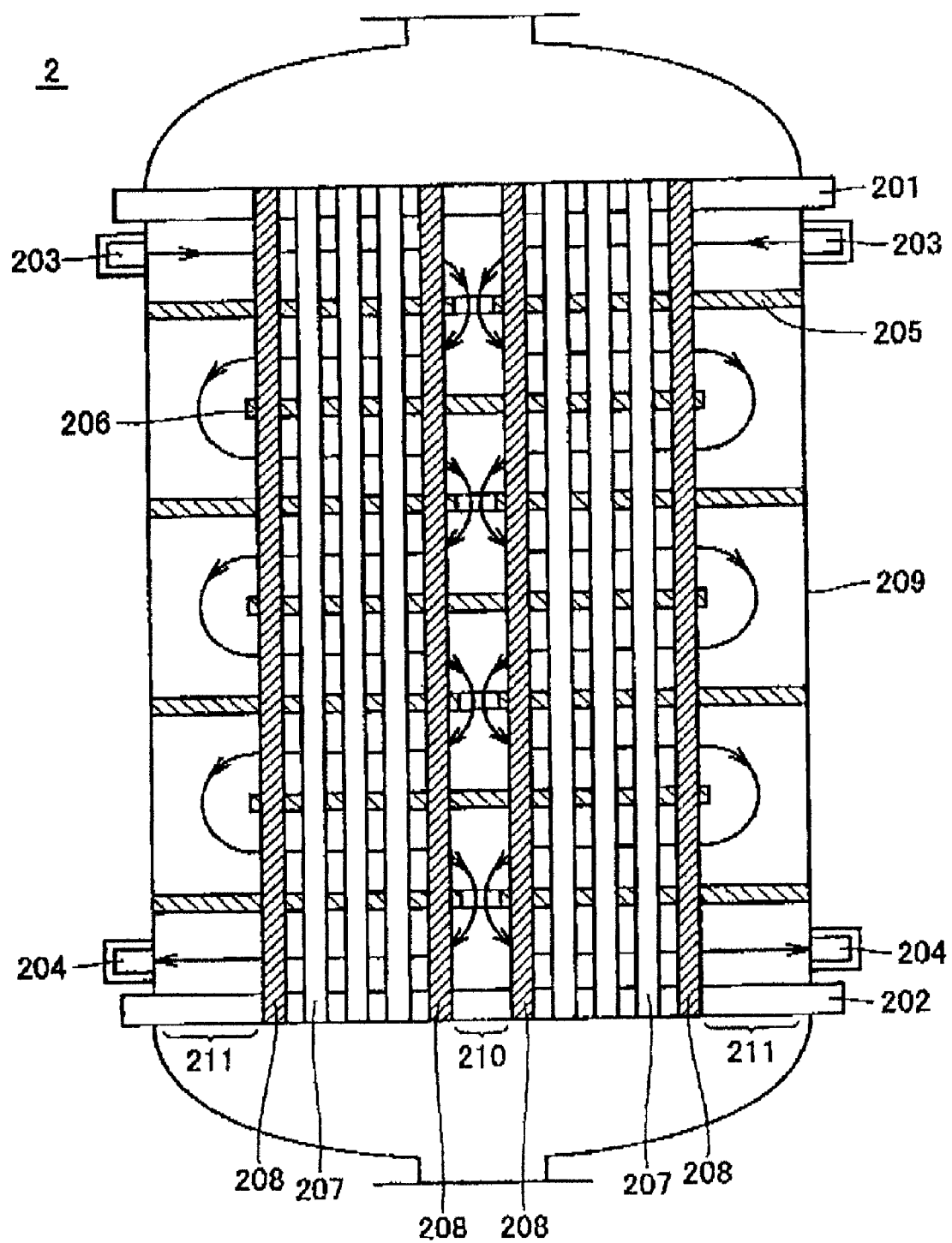
FIG. 2 is a sectional view indicating another embodiment of the multitubular catalytic gas-phase reaction apparatus of the present invention.

FIG. 2 is a sectional view indicating another example of the multitubular catalytic gas-phase reaction apparatus of the present invention. A multitubular reaction apparatus 2 includes an upper tube plate 201, a lower tube plate 202, a heat medium inlet 203, a heat medium outlet 204, baffles 205, 206, reaction tubes 207 and flow-adjusting rods 208. A heat medium is introduced into the inside of a reactor shell 209 from the heat medium inlet 203 by way of a circular conduit by means of, for example, a pump (not shown) such as an axial flow pump, centrifugal pump or the like, and flows in the arrow directions, and then is discharged from the heat medium outlet 204. In the multitubular reaction apparatus indicated in FIG. 2, the baffle 205 is a perforated disc baffle and the baffle 206 is a disc baffle; in the longitudinal direction of the reaction tubes are alternately arranged the baffles 205 and 206. The Interval of the baffles 205 and 206 is not particularly limited, and the baffles, depending on the purpose, are disposed in such a way that, for example, the heat transfer coefficient between the heat medium and the reaction tubes is 1000 W/m²K or more.

In the multitubular reaction apparatus indicated in FIG. 2, a heat medium is supplied by means of a circular conduit. The heat medium inlet 203 and the heat medium outlet 204 of the circular conduit are arranged so as to surround the entire periphery of the multitubular reaction apparatus. In the circular conduit, openings are intermittently disposed over the entire periphery of the multitubular reaction apparatus; from the openings are preferably introduced or discharged a heat medium.

Additionally, in the multitubular reaction apparatus of FIG. 2, as in the multitubular reaction apparatus to FIG. 1, a raw material of catalytic gas-phase reaction may be supplied in an up-flow or a down-flow: the flow of a heat medium may also be carried out in either an up-flow or a down-flow manner. That is, the flow channels of the raw material and the heat medium may be concurrent or convective, and selected, as appropriate, depending on the purpose.

Figure 3:
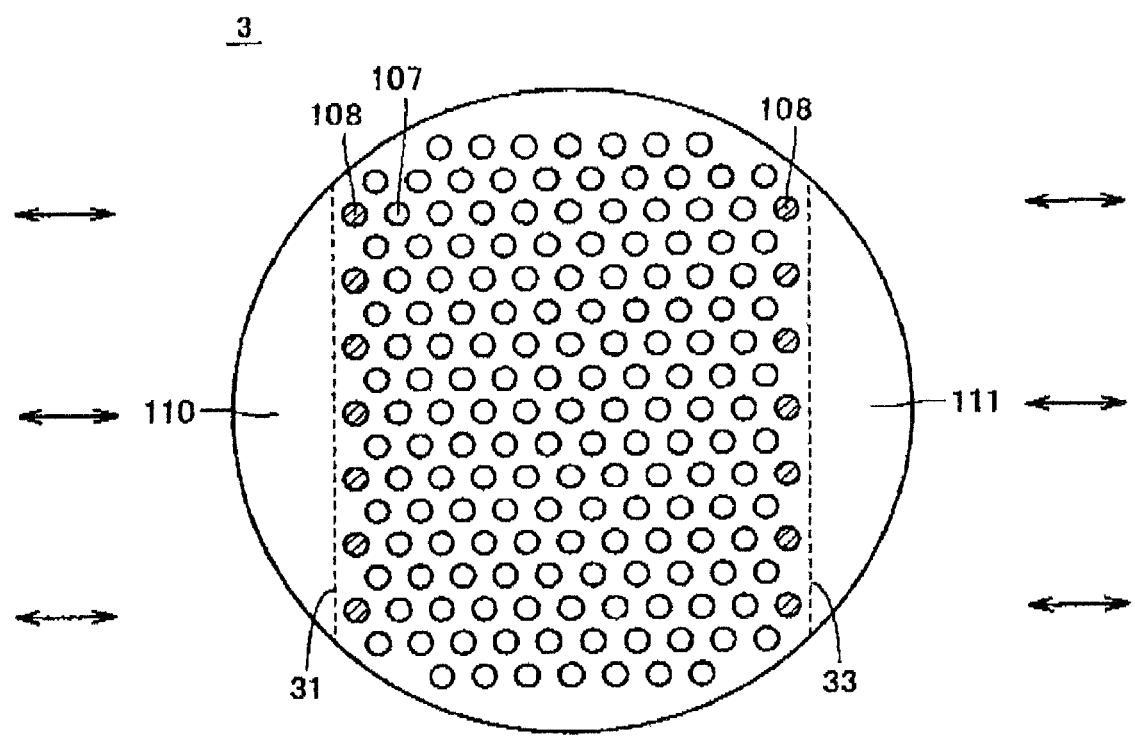
FIG. 3 is a diagram indicating the shape of a baffle arranged in the multitubular catalytic gas-phase reaction apparatus indicated in FIG. 1.

FIG. 3 is a diagram indicating the shape of a baffle arranged in the multitubular catalytic gas-phase reaction apparatus indicated in FIG. 1. Through a baffle 3 excluding the spaces 110, 111 are penetrated the reaction tubes 107 and the flow-adjusting rods 108; by the baffle 3 are supported the reaction tubes 107 and the flow-adjusting rods 108. The directions of the flow of a heat medium by the distributor pipe are indicated by arrows. Here, the baffle 105 in FIG. 1 has a shape lacking the space 110 as a segmental baffle window; the baffle 106 has a shape lacking the space 111 as a segmental baffle window. An alternate disposition of the baffles 105 and 106 causes the space 110 in the baffle 105 and the space 111 in the baffle 106 to be flow channels of a heat medium. In FIG. 3, although the flow-adjusting rods 108 are arranged in one row along boundaries 31, 33 of the sites where the reaction tubes are arranged and the spaces 110, 111, they may be arranged in two or more rows; the number and the arrangement of the reaction tubes 107 and the flow-adjusting rods 108 are not limited thereto.

Figure 4:
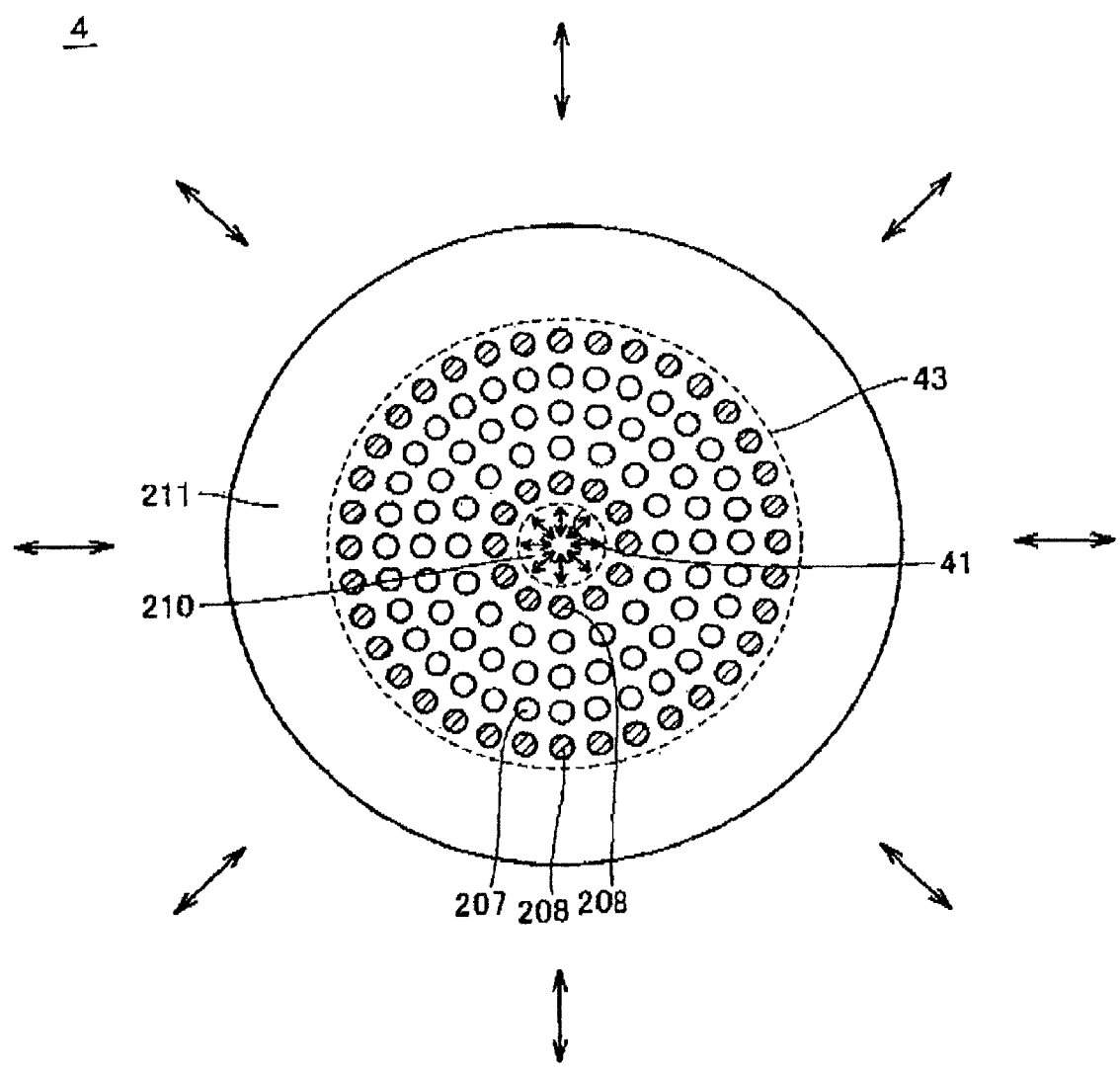
FIG. 4 is a diagram indicating the shape of a baffle arranged in the multitubular catalytic gas-phase reaction apparatus indicated in FIG. 2.

FIG. 4 is a diagram Indicating the shape of a baffle arranged in the multitubular catalytic gas-phase reaction apparatus indicated in FIG. 2. Through a baffle 4 excluding the spaces 210, 211 are penetrated the reaction tubes 207 and the flow-adjusting rods 208; by the baffle 4 are supported the reaction tubes 207 and the flow-adjusting rods 208. The directions of the flow of a heat medium by the circular conduit are indicated by arrows. Here, the baffle 205 has a shape lacking the space 210 as a perforation; on the other hand, the baffle 206 has a shape lacking the space 211. An alternate disposition of the baffles 205 and 206 causes the space 210 in the baffle 205 and the space 211 in the baffle 206 to be flow channels of a heat medium. In FIG. 4, although the flow-adjusting rods 208 are arranged in one row along the boundaries 41, 43 of the sites where the reaction tubes are arranged and the spaces 210, 211, they may be arranged in two or more rows; the number and the arrangement of the reaction tubes 207 and the flow-adjusting rods 208 are not limited thereto.

FIGS. 1 to 4 show embodiments where the flow-adjusting rods 108, 208 are arranged in one row in between the spaces and the reaction tubes; however, the present invention is not limited thereto, and flow-adjusting rods are preferably arranged in the range of from 1 to 10 rows along the boundary of the spaces and reaction tubes in between the spaces and the reaction tubes. The arrangement of flow-adjusting rods in one or more rows can have an effect of bringing the flow of a heat medium in contact with the reaction tubes close to a straightened flow: if the number of flow-adjusting rods are 10 rows or less, a decline in production efficiency by decrease in the number of the reaction tubes is prevented and also an increase in production cost as a result of upsizing of the reaction apparatus is prevented. The flow-adjusting rods are further preferably arranged in the range of 1 to 5 rows, particularly preferably in the range of 1 to 3 rows.

As a shape of the flow-adjusting rod, the shape of a column, a square pole, a triangle pole, or the like is preferably adopted; the shape is not particularly limited; a shape may be acceptable that homogenizes the flow of a heat medium in contact with a plurality of reaction tubes as compared with a case where no flow-adjusting rods are arranged. In a catalytic gas-phase reaction, a catalyst is normally charged in a reaction tube, and thus, as a flow-adjusting rods, dummy tubes are preferably arranged that are the reaction tubes not having a catalyst charged therein. In this case, the reaction tube and the flow-adjusting rod may be made of different materials or of the same material. When they are made of the same material, because there are substantially no differences in thermal conduction behaviors and the like between the reaction tube and the flow-adjusting rod, the control of the designing of an apparatus and supply conditions of a heat medium can be simplified.

Preferred materials of the reaction tube in the multitubular reaction apparatus of the present invention include, for example, metals, glass, ceramics and the like. Metal materials include Ni, SUS316L, SUS310, SUS304, hastelloy S, hastelloy C, inconel and the like. Of these, Ni, particularly Ni with a carbon content of 0.02 mass % or less, is preferable.

Materials of the flow-adjusting rod that are preferably used include, as in the case of the above reaction tube, for example, metals, glass, ceramics and the like; the metal materials that are preferably used include iron, Ni, SUS316L, SUS310, SUS304, hastelloy S, hastelloy C, inconel and the like. For example, a combination of Ni used for the reaction tube and iron used for the flow-adjusting rod, or a combination of Ni used for the reaction tube and Ni used for the flow-adjusting rod, or the like, can be preferably adopted.

Preferred heat media used in the multitubular reaction apparatus of the present invention include heat media generally used as heat media of catalytic gas-phase reaction; the examples thereof include melt salts, organic heat media, melt metals, or the like; from the viewpoints of thermal stability and ease of handling, melt salts are preferred. Compositions of melt salts can include a mixture of 50 mass % of potassium nitrate and 50 mass % of sodium nitrite, a mixture of 53 mass % of potassium nitrate, 40 mass % of sodium nitrite and 7 mass % of sodium nitrate, and the like.

Baffles in the present invention that are preferably used include existent baffles such as disc baffles, perforated disc baffles and segmental circle baffles. For example, when a segmental circle baffle as indicated in FIG. 3 is used, an inlet and an outlet of a heat medium are preferably a distributor pipe. Additionally, for example, when a disc baffle and a perforated baffle as indicated in FIG. 4 are used, an inlet and an outlet of a heat medium are preferably a circular conduit.

When, for example, a segmental circle baffle as indicated in FIG. 3 is disposed as a baffle, preferably, the spaces 110, 111 disposed in the segmental circle section are flow channels of a heat medium, and the flow-adjusting rods 108 are disposed in between the spaces 110, 111 and the reaction tubes 107. In this case, the reaction tubes can be efficiently laid out in sites other than the spaces 110, 111, whereby good production efficiency can be yielded.

Also, when, for example, a disc baffle and a perforated disc baffle as indicated in FIG. 4 are alternately disposed as baffles, preferably, the space 210 disposed in a perforated section of the perforated disc baffle and the space 211 disposed in between the periphery of the disc baffle and the side wall of the reactor shell are flow channels of a heat medium, and the flow-adjusting rods 208 are disposed in between the spaces 210, 211 and the reaction tubes 207. In this case, the reaction tubes 207 can be efficiently laid out in sites other than the spaces 210, 211, whereby good production efficiency can be yielded.

In the present invention, all the reaction tubes are preferably supported by their penetration through the baffles. In this case, the heat medium flowing in the direction of the faces of the baffles is made to be selectively in contact with the reaction tubes, so the heat removability is good. It is particularly preferable that all the reaction tubes and the flow-adjusting rods are supported by their penetration through the baffles.

In the present invention, the size of the reaction tube is not particularly limited, and a reaction tube generally used in catalytic gas-phase reaction can be used. For example, a reaction tube having an inner diameter of about 10 to 70 mm, an outer diameter of about 13 to 80 mm, and a length of the tube of about 1000 to 10000 mm can be preferably adopted from the viewpoints of reaction efficiency and heat removal efficiency.

The layout of the reaction tubes in the multitubular reaction apparatus of the present invention is not particularly limited; the interval of the center of each of the reaction tubes is preferably disposed so as to be in the range of 1.1 to 1.6 times the outer diameter of the reaction tube, more preferably in the range of 1.15 to 1.4 times. If the interval of the center of each of the reaction tube is 1.1 times or more the outer diameter of the reaction tube, a flow channel of a heat medium is sufficiently ensured, so the heat removability of reaction heat is good; if the interval is 1.6 times or less, an increase in production cost as a result of upsizing of a reaction apparatus is prevented and a decrease in linear speed of a heat medium and/or a decrease in heat removability caused by a drift current is also prevented.

When a segmental circle baffle is set up in the present invention, the cross sectional area Of a space in a radial direction of a reactor shell is preferably in the range of 5 to 30%, and more preferably in the range of 5 to 20%, of the cross sectional area of the reactor shell in the direction. If the above cross sectional area of the space is 5% or more of the above cross sectional area of the reactor shell, the flow channel of a heat medium is sufficiently ensured, so the heat removability of reaction heat is good; if the cross sectional area is 30% or less, an increase in production cost as a result of upsizing of a reaction apparatus is prevented and a decrease in linear speed of a heat medium and/or a decrease in heat removability caused by a drift current is also prevented.

When a perforated disc baffle is used as a baffle of the present invention, the perforation cross sectional area of the perforated disc baffle is preferably in the range of 2 to 40%, and more preferably in the range of 5 to 20%, of the cross sectional area within the reactor shell. If the perforation cross sectional area of the perforated disc baffle is 2% or more, an decrease in heat removability due to the stall of a heat medium flow can be prevented; if it is 40% or less, a region uniform in heat removability can be ensured in an amount of a specific value or more, so the number of reaction tubes arranged can be made to be sufficiently large; as a result, the production efficiency is good.

In catalytic gas-phase reaction, normally a catalyst is charged in a reaction tube. In this case, the inside of the reaction tube is preferably divided into a plurality of zones by varying the kind and/or the amount of a catalyst. When a raw material is supplied to the reaction tube charged with a catalyst, in proximity to the reaction tube inlet, i.e., the raw material supply inlet, the reaction rate is large; as the distance from the reaction tube inlet becomes long, the raw material concentration tends to be low and the reaction rate tends to be low. Consequently, in exothermal reaction, the amount of heat release in proximity to the reaction tube inlet may be excessive, whereby excessive hot spots may be formed in some cases. When a reaction tube is divided into a plurality of zones in which the kind and/or the amount of a catalyst is varied, for example in proximity to the reaction tube inlet, a catalyst with low catalyst activity can be charged or the amount of a catalyst can be reduced to prevent from run away reaction, and as the distance from the reaction tube inlet becomes long, a catalyst with high catalyst activity can be charged, or a catalyst can be charged such that the amount of catalyst is large. In this case, the deviation of the reaction rate in the inside of the reaction tube can be made small, so the formation of excessive hot spots can be suppressed and also rendering the exothermal reaction to uniformly proceed can improve the conversion of a raw material. Additionally, the reactor shell may be divided and heat media with different temperatures may be independently circulated to the respective regions to control the temperatures.

The present invention is suitably used as a reaction apparatus used in exothermal reactions such as oxidation reaction; examples of the reaction that can be adopted include catalytic gas-phase oxidation reaction to generate chlorine gas using hydrogen chloride gas and oxygen gas as raw materials, catalytic gas-phase oxidation reaction to generate (meth)acrolein and further (meth)acrylic acid using propylene or isobutylene and oxygen as raw materials, and the like; in particular, the reaction can be preferably used in production of chlorine gas. In addition, the multitubular catalytic gas-phase reaction apparatus of the present invention can be effectively adopted for a system in which the size of a reactor is large and the nonuniformity of a catalyst flow is prone to occur.

Chlorine gas can be produced by catalytic gas-phase reaction to introduce hydrogen chloride gas and oxygen gas as raw materials into a reaction tube charged with a catalyst. Hydrogen chloride gas can be supplied as a gas containing hydrogen chloride generated in, for example, thermal decomposition reaction or combustion reaction of chlorine compounds, phosgenation reaction or chlorination reaction of organic compounds, combustion in an incinerator, etc. In this case, the concentration of hydrogen chloride gas in a gas containing hydrogen chloride can be made to be, for example, 10 volume % or more, further 50 volume % or more, still further 80 volume % or more, from the viewpoint of production efficiency.

Oxygen gas may be supplied alone, or for example as air or the like; it may be supplied as an oxygen-containing gas. The concentration of oxygen in an oxygen-containing gas can be made to be, for example, 80 volume % or more, further 90 volume % or more, from the viewpoint of production efficiency. An oxygen-containing gas having an oxygen concentration of 80 volume % or more can be obtained by normal industrial methods such as, for example, a pressure swing process of air and cryogenic separation.

As a catalyst, a catalyst containing ruthenium and/or a ruthenium compound is preferably used. This case prevents clogging troubles of piping or the like due to evaporation or splash of a catalyst component and also eliminates the need of a step of processing an evaporated or splashed catalyst component. Furthermore, chlorine can be produced at a more advantageous temperature also from the viewpoint of chemical equilibrium, so post steps such as a drying step, purifying step, absorbing step, etc. can be simplified, and thus facility and operation costs can be restrained to a low level. In particular, a catalyst containing ruthenium oxide is preferably used. The use of a catalyst containing ruthenium oxide has the advantage of extremely improving the conversion of hydrogen chloride. The content of ruthenium oxide in a catalyst is made to be preferably within the range of 1 to 20 mass %, in terms of the balance of catalyst activity and catalyst price. A catalyst can be used by being supported on a carrier such as, for example, silicon dioxide, graphite, rutile or anatase titanium dioxide, zirconium dioxide or aluminum oxide.

When a plurality of zones in which the kind and/or the amount of a catalyst is varied is disposed in a reaction tube, the construction can be preferably adopted that involves, for example, charging a catalyst having a small content of ruthenium oxide in the inlet side of the reactor and charging a catalyst having a large content of ruthenium oxide in the outlet side. This case restrains run away reaction, so the reaction rate distribution within the reaction tube is made relatively uniform, thus having the advantage of suppressing the formation of excessive hot spots.

Examples

Figure 5:
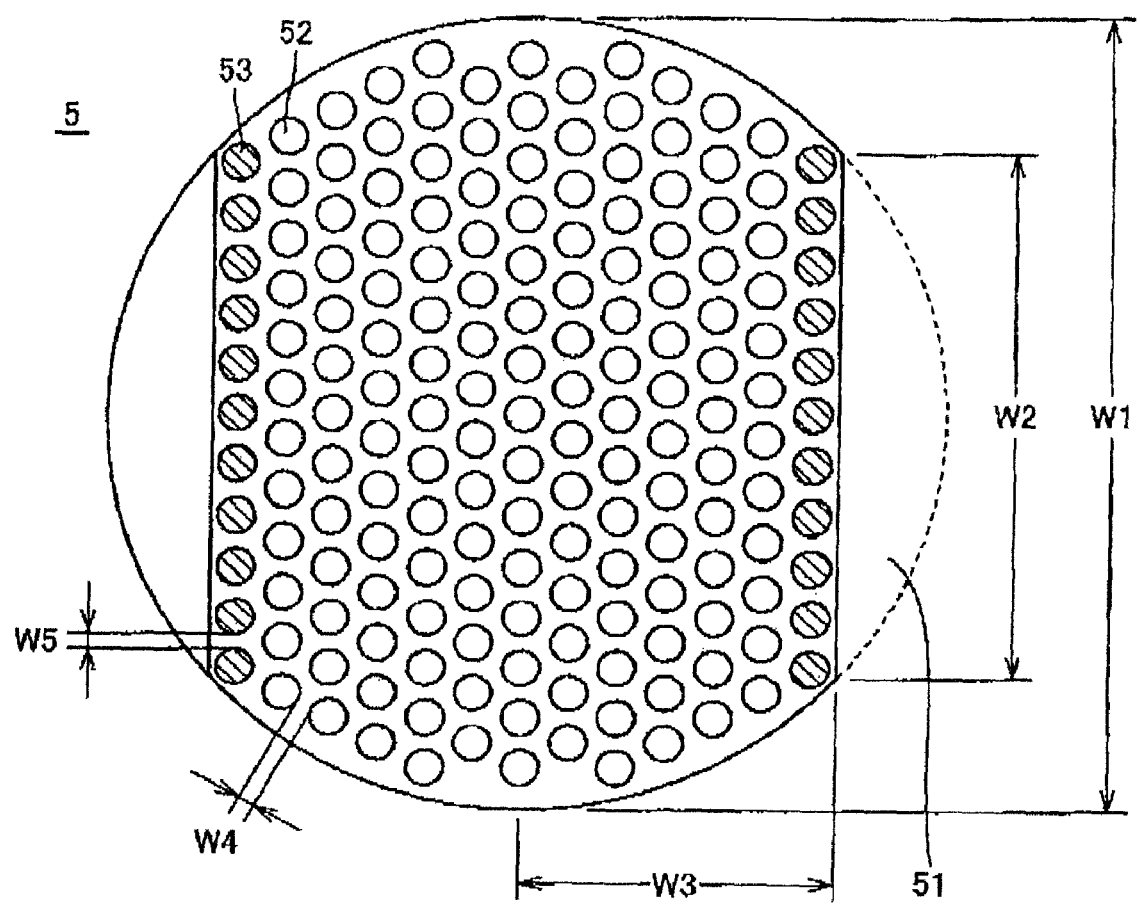
FIG. 5 is a diagram indicating the shape of a baffle adopted in a simulation of the present example.

Hereinafter, the present invention will be set forth in more detail by means of an example; however, the invention is not limited thereto (1) Simulation of the Flow Rate of a Heat Medium A simulation was performed for the flow rate of a heat medium within the reactor shell 109 in the multitubular reaction apparatus as indicated in FIG. 1. FIG. 5 is a diagram indicating the shape of a baffle adopted in the simulation of this example. The reaction tubes 52 and the flow-adjusting rods 53 are disposed so as to penetrate through the baffle 5 having a segmental baffle window 51 disposed therein. In this example, the flow-adjusting rods 53 are disposed in one row in between spaces and the reaction tubes 52.

The horizontal component (i.e., the component of the baffle face direction) of the flow rate of the heat medium flowing in the region till 50 mm on the baffle face towards the central line from the segmental baffle window 51 of the baffle was measured, and thereby the flow of the heat medium above and below the baffle was analyzed. This is because the vertical component is thought to flow along the reaction tubes, and not to have substantially contributed to cooling. The larger the horizontal component of the flow rate of the heat medium is, the better the cooling efficiency, leading to rare formation of hot spots. Moreover, if the heat medium flows backwards to the segmental baffle window 51 from the central line, an eddy of the flow of the heat medium is formed, so the cooling efficiency is reduced. Parameters of the simulation model are indicated in the following.

(Reaction Vessel)

Inner diameter: 450 mm

Baffle interval: 277 mm
 (Baffle)

Body Inner diameter W1: 450 mm

Baffle edge length W2: 306 mm

Distance W3 from the central-line of the reaction vessel to the segmental baffle window of the baffle: 165 mm Thickness: 6 mm
 (Reaction Tube)

Outer diameter: 21.4 mm

Pitch W4: 29 mm

Arrangement: equilateral triangle arrangement

Number of tubes: 158
 (Flow-Adjusting Rod)

Outer diameter: 22 mm

Pitch W5: 29 mm

Arrangement: One row along the segmental baffle window

Number of rods: 11 rods per row
 (Heat Medium)

Kind: HTS

Flow rate: 18 $m^3/h$

Here, as simulation analysis software, "Fluent" (available from Fluent Inc., U.S.) was adopted.

(2) Simulation Results

The results of the simulation using the above parameters are listed in Table 1. The results of Table 1 indicate that the flow rate of the heat medium in the site where the flow-adjusting rods 53 are laid out is a minus, so the heat medium flows backwards to the segmental baffle window 51 from the central line in the site; on the other hand, that the horizontal component of the flow rate of the heat medium in the site of the second row of the reaction tubes is sufficiently large, so the heat medium normally flows. These results show that disposition of the flow-adjusting rods 53 in between the reaction tubes 52 and the segmental baffle window 51 can arrange the reaction tubes 52 only where the flow of the heat medium is normal. The formation of hot spots mainly occurs in sites where the flow of the heat medium is abnormal, so in the multitubular reaction apparatus of the present invention that renders normal the flow of the heat medium passing through the reaction tubes, the formation of excessive hot spots is thought to be suppressed.

TABLE 1

| Example | Heat medium flow rate in the 1st row (flow-adjusting rods) | −0.04 $m^3/h$ |
|---|---|---|
| | Heat medium flow rate in the 3rd row (2nd row of the reaction tubes) | +0.05 $m^3/h$ |

The embodiment and example disclosed herein should be thought to be all exemplary and not to be limitative. The scope of the present invention is not only limited to the above descriptions, but indicated by the claims; all modifications are intended to be included within the claims and senses and scopes equivalent thereto.

INDUSTRIAL APPLICABILITY

A multitubular reactor of the present invention keeps normal the heat conduction of a reaction tube and a heat medium and restrains the formation of excessive hot spots, and thus is suitable as a multitubular reaction apparatus used in the production of, particularly, chlorine by the reaction of a gas containing hydrogen chloride and a gas containing oxygen.

What is claimed is:

1. A multitubular catalytic gas-phase reaction apparatus, comprising:
 a plurality of reaction tubes arranged in parallel,
 a baffle capable of changing the direction of movement of a heat medium introduced into a reactor shell to a direction perpendicular to the longitudinal direction of the reaction tubes, and wherein the baffle is a segmental circle baffle, a space that is disposed in a region including a part of a section where the heat medium flows in the direction of the face of the baffle and does not have the reaction tubes arranged therein, and wherein the space is disposed in a segmental baffle window of the segmental circle baffle, and flow-adjusting rods, disposed in between the space and the reaction tubes, having the same longitudinal direction as that of the reaction tubes, and wherein the flow-adjusting rods are arranged in the range of from 1 to 10 rows along the boundaries of the spaces and the reaction tubes, and the flow-adjusting rods are supported by their penetration through the baffles.

2. The multitubular catalytic gas-phase reaction apparatus according to claim 1, wherein the reaction tubes are charged with a catalyst and the flow-adjusting rods are dummy tubes not charged with a catalyst in reaction tubes.

3. The multitubular catalytic gas-phase reaction apparatus according to claim 1, wherein a heat medium inlet and a heat medium outlet are formed as circular conduits.

4. The multitubular catalytic gas-phase reaction apparatus according to claim 1, wherein a heat medium inlet and a heat medium outlet are formed as distributor pipes.

5. The multitubular catalytic gas-phase reaction apparatus according to claim 1, wherein the reaction tubes are charged with a catalyst and the inside of the reaction tubes are divided into a plurality of zones by varying the kind and/or amount of the catalyst.

6. The multitubular catalytic gas-phase reaction apparatus according to claim 1, which is used in the production of chlorine gas.

* * * * *